United States Patent
Noma et al.

(10) Patent No.: US 6,690,552 B2
(45) Date of Patent: Feb. 10, 2004

(54) MAGNETORESISTIVE FILM, HEAD, AND INFORMATION REGENERATION APPARATUS HAVING IMPROVED CURRENT FLOW CHARACTERISTICS

(75) Inventors: Kenji Noma, Kawasaki (JP); Hitoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 09/729,392

(22) Filed: Dec. 4, 2000

(65) Prior Publication Data

US 2002/0006019 A1 Jan. 17, 2002

(30) Foreign Application Priority Data

May 19, 2000 (JP) .......................... 2000-147540

(51) Int. Cl.[7] ................................. G11B 5/39
(52) U.S. Cl. .................. 360/322; 360/324.11
(58) Field of Search ................ 360/322, 324.11

(56) References Cited

U.S. PATENT DOCUMENTS 6,221,172 B1   4/2001   Saito et al.

FOREIGN PATENT DOCUMENTS

| JP | 11-185219 | 7/1999 |
| JP | 2000-040209 | 2/2000 |

Primary Examiner—Craig A. Renner
(74) Attorney, Agent, or Firm—Greer, Burns & Crain, Ltd.

(57) ABSTRACT

There is provided a magnetoresistive film high in resistance to destruction. The magnetoresistive film is a multilayered film including: an antiferromagnetic layer 2 for generating a bias magnetic field; a pinned magnetic layer 3 having magnetization whose direction is fixed by the bias magnetic field; a free magnetic layer 5 having magnetization whose direction changes in accordance with an external magnetic field; and a nonmagnetic middle layer 4 held between the pinned magnetic layer and the free magnetic layer, and is held by a pair of insulation layers (not shown). When a current is passed parallel to the magnetoresistive film, a current center as a position of the thickness direction for dividing the current into two so as to obtain respective equal current amounts is positioned on a side including the pinned magnetic layer during dividing of the magnetoresistive film into two in a center position of a layer thickness of the nonmagnetic middle layer in the thickness direction.

4 Claims, 5 Drawing Sheets

PRIOR ART

PRIOR ART

MAGNETORESISTIVE FILM, HEAD, AND INFORMATION REGENERATION APPARATUS HAVING IMPROVED CURRENT FLOW CHARACTERISTICS

BACKGROUND OF THE INVENTION i) Field of the Invention

The present invention relates to a magnetoresistive film indicating a resistance change in accordance with an external magnetic field strength, a magnetoresistive head for utilizing the resistance change of the magnetoresistive film to detect the external magnetic field strength, and an information regeneration apparatus for regenerating information recorded in a recording medium.

ii) Description of Related Art

In recent years, with spread of computers, a large amount of information has been handled in a daily manner. Such information is usually recorded on a recording medium as a large number of physical marks, and regenerated by an information regeneration apparatus for reading the marks on the recording medium to regenerate an electric regeneration signal.

A hard disk drive (HDD) is one of the information regeneration apparatuses, and is characterized in that a memory capacity is large and access speed to the information is fast. The HDD is generally provided with a magnetic disk as the recording medium whose surface is formed of a magnetic material, and a regeneration head for regenerating the information recorded on the magnetic disk. For the magnetic disk, a surface is magnetized for each micro area (one-bit region), and one bit of information is recorded in a form of a magnetization direction of the one-bit region. The regeneration head is disposed in the vicinity of the magnetic disk, and outputs the electric regeneration signal in accordance with a signal magnetic field $H_{sig}$ generated from the magnetization of the one-bit region of the magnetic disk to regenerate the information recorded on the magnetic disk.

A recording density of the magnetic disk continues to be enhanced year by year, an area of the one-bit region decreases with enhancement of the recording density, and the signal magnetic field $H_{sig}$ generated from the one-bit region is weakened. Therefore, a magnetic head for outputting a large regeneration signal is necessary even for this weak signal magnetic field $H_{sig}$. As the regeneration head for outputting the large regeneration signal, a spin valve magnetoresistive head (SVMR head) which is a magnetoresistive head utilizing a giant magnetoresistive (GMR) effect starts to be put to practical use in earnest.

The SVMR head is provided with a spin valve magnetoresistive film as a multilayered film including a free magnetic layer whose magnetization direction changes in accordance with the external magnetic field, a nonmagnetic middle layer formed adjacent to the free magnetic layer and provided with conductivity, a pinned magnetic layer formed adjacent to the nonmagnetic middle layer and having the magnetization whose direction is fixed in a predetermined direction, and an antiferromagnetic layer formed adjacent to the pinned magnetic layer and constituted of an antiferromagnetic material for fixing the magnetization direction of the pinned magnetic layer. For the magnetoresistive film, a resistance change is caused in accordance with a relative angle change of magnetization directions of the free magnetic layer and pinned magnetic layer, a resistivity is minimized when the magnetization directions are directed in the same direction, and the resistivity is maximized when magnetizations are directed in opposite directions. The magnetoresistive film is provided with a pair of electrode terminals apart from each other in a film spread direction, and during operation a sense current is passed through the magnetoresistive film from the pair of electrode terminals. While the sense current flows, and the SVMR head is disposed close to a magnetic disk and relatively moved, an electric resistivity of the magnetoresistive film successively changes in accordance with a signal magnetic field $H_{sig}$ from the magnetic disk, and a regeneration signal with an output voltage represented by a product of the electric resistivity and the sense current value is outputted.

In recent years, for the SVMR head, in order to satisfactorily detect a magnetic field generated from the aforementioned micro one-bit region, an area of the magnetoresistive film is reduced to an order of 0.1×0.1 $\mu m^2$, and to obtain a high output from the regeneration signal, a thickness of the magnetoresistive film is reduced to an order of several tens of nanometers.

In the magnetoresistive film in the SVMR head, even under normal use conditions of the head mounted on HDD, except the sense current, a large pulse current generated by static electricity sometimes flows. When the large pulse current flows, a temperature of the magnetoresistive film rises. For the magnetoresistive film whose size is reduced as described above, since resistance is large and thermal capacity is small, the temperature is increased to a particularly high temperature by the pulse current. Moreover, the magnetic field is generated with the pulse current, and the magnetoresistive film is exposed to the magnetic field. It is known that when the magnetoresistive film is exposed to the magnetic field in the raised temperature, magnetic destruction, such as magnetization direction change of the pinned magnetic layer and magnitude reduction of the magnetization, easily occurs. When the magnetoresistive film is destroyed, problems such as a remarkable drop of regeneration signal output and an output trouble arise.

SUMMARY OF THE INVENTION

The present invention has been developed in consideration of the aforementioned situations, and an object thereof is to provide a magnetoresistive film high in resistance to destruction, a magnetoresistive head provided with the magnetoresistive film, and an information regeneration apparatus provided with the magnetoresistive head.

In order to attain the aforementioned object, according to the present invention, there is provided a magnetoresistive film comprising a multilayered film including: a bias layer for generating a bias magnetic field; a pinned magnetic layer having magnetization whose direction is fixed by the bias magnetic field generated from the bias layer; a free magnetic layer having magnetization whose direction changes in accordance with an external magnetic field; and a nonmagnetic middle layer held between the pinned magnetic layer and the free magnetic layer in a thickness direction and indicating a magnitude of resistance in accordance with an angle between the magnetization direction of the pinned magnetic layer and the magnetization direction of the free magnetic layer, and being held between a pair of insulation layers in the thickness direction.

When a current is passed parallel to the magnetoresistive film, a current center as a position of the thickness direction for dividing the current into two so as to obtain respective equal current amounts is positioned on a side including the pinned magnetic layer during dividing of the magnetoresistive film into two in a center position of a layer thickness of the nonmagnetic middle layer in the thickness direction.

For the magnetoresistive film of the present invention, the current center is preferably positioned in the pinned magnetic layer.

For the magnetoresistive film of the present invention, the temperature fails to be prevented from rising, but as compared with the conventional magnetoresistive film, the current center is positioned close to the pinned magnetic layer or on the pinned magnetic layer. In this case, for example, even when a large pulse current attributed to static electricity or the like as described in the related art flows through the magnetoresistive film, a magnetic field strength applied to the magnetization of the pinned magnetic layer is minimized by the pulse current, and therefore any trouble fails to easily occur in the magnetization of the pinned magnetic layer. Therefore, the magnetoresistive film of the present invention is high in resistance to destruction.

In order to attain the aforementioned object, according to the present invention, there is provided a magnetoresistive head, provided with a magnetoresistive film comprising a multilayered film including: a bias layer for generating a bias magnetic field; a pinned magnetic layer having magnetization whose direction is fixed by the bias magnetic field generated from the bias layer; a free magnetic layer having magnetization whose direction changes in accordance with an external magnetic field; and a nonmagnetic middle layer held between the pinned magnetic layer and the free magnetic layer in a thickness direction and indicating a magnitude of resistance in accordance with an angle between the magnetization direction of the pinned magnetic layer and the magnetization direction of the free magnetic layer, for detecting the magnitude of the resistance of the magnetoresistive film to detect a strength of the external magnetic field.

The magnetoresistive head comprises a pair of insulation layers for holding the magnetoresistive film in the thickness direction.

For the magnetoresistive film held by the pair of insulation layers, when a current is passed parallel to the magnetoresistive film, a current center as a position of the thickness direction for dividing the current into two so as to obtain equal current amounts is positioned on a side including the pinned magnetic layer during dividing of the magnetoresistive film into two in a center position of a layer thickness of the nonmagnetic middle layer in the thickness direction.

For the magnetoresistive head of the present invention, the current center is preferably positioned in the pinned magnetic layer.

Since the magnetoresistive head employs the magnetoresistive film of the present invention as the magnetoresistive film, the resistance to destruction of the magnetoresistive film is enhanced, and information regeneration is steadily performed.

In order to attain the aforementioned object, according to the present invention, there is provided an information regeneration apparatus comprising a magnetic head, disposed in the vicinity of or in contact with a magnetic recording medium on which information is recorded in accordance with a magnetization direction, for detecting the magnetization direction of respective points of the magnetic recording medium, to regenerate the information in accordance with the magnetization direction of the respective points of the magnetic recording medium detected by the magnetic head.

The magnetic head comprises a magnetoresistive film comprising a multilayered film including: a bias layer for generating a bias magnetic field; a pinned magnetic layer having magnetization whose direction is fixed by the bias magnetic field generated from the bias layer; a free magnetic layer having magnetization whose direction changes in accordance with an external magnetic field; and a nonmagnetic middle layer held between the pinned magnetic layer and the free magnetic layer in a thickness direction and indicating a magnitude of resistance in accordance with an angle between the magnetization direction of the pinned magnetic layer and the magnetization direction of the free magnetic layer, and detects the magnitude of the resistance of the magnetoresistive film to detect a strength of the external magnetic field.

The magnetic head comprises a pair of insulation layers for holding the magnetoresistive film in the thickness direction.

For the magnetoresistive film held by the pair of insulation layers, when a current is passed parallel to the magnetoresistive film, a current center as a position of the thickness direction for dividing the current into two so as to obtain respective equal current amounts is positioned on a side including the pinned magnetic layer during dividing of the magnetoresistive film into two in a center position of a layer thickness of the nonmagnetic middle layer in the thickness direction.

Since the information regeneration apparatus employs the magnetoresistive head of the present invention as the magnetoresistive head, the resistance to destruction of the magnetoresistive film is enhanced, and information regeneration is steadily performed.

DETAILED DESCRIPTION OF THE PREFERRED EMBODIMENTS

A preferred embodiment of the present invention will be described hereinafter.

Figure 1:
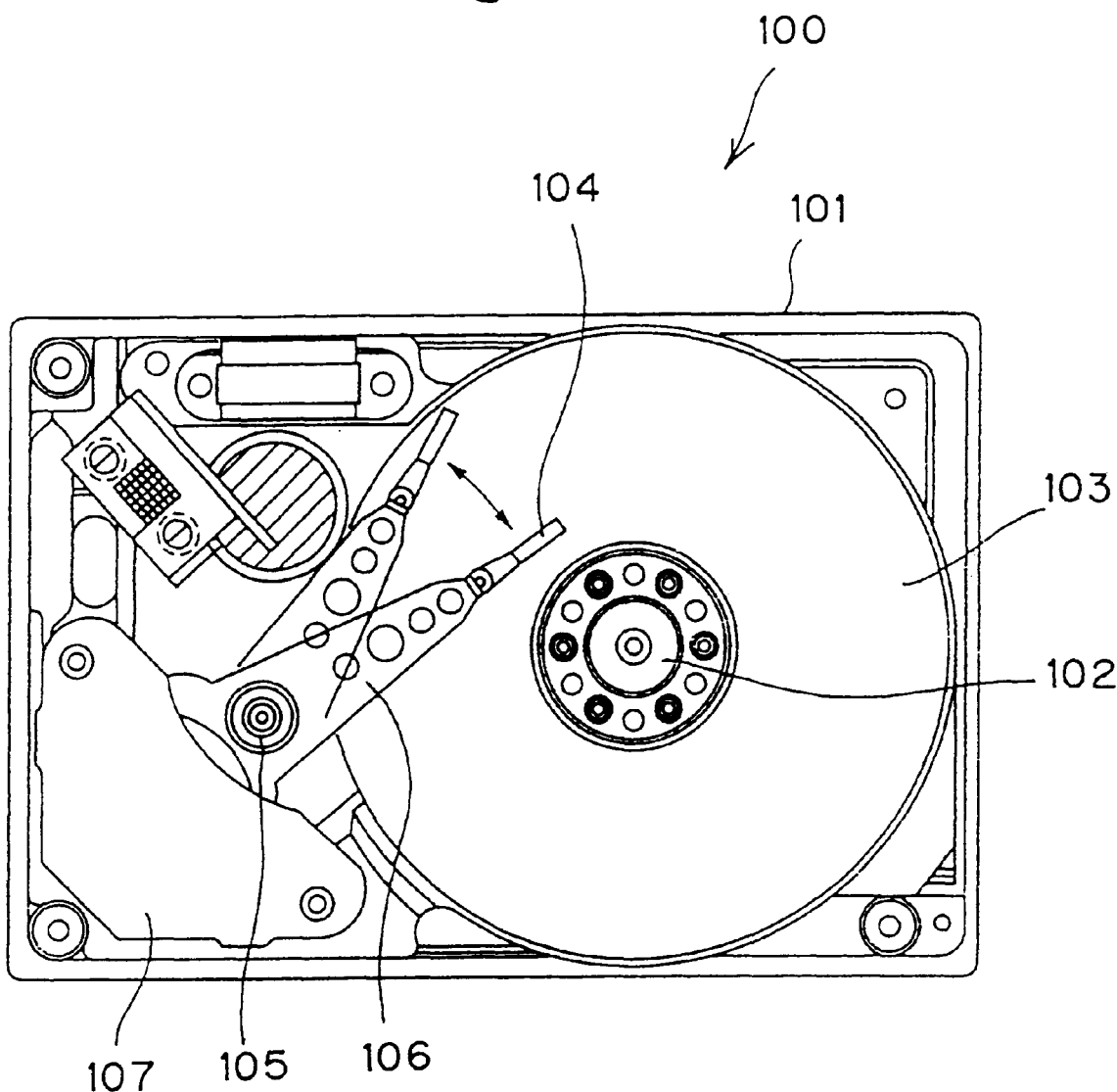
FIG. 1 is a schematic view of a hard disk drive of the present embodiment.

FIG. 1 is a schematic view of a hard disk drive of the present embodiment.

A hard disk drive (HDD) 100 shown in FIG. 1 corresponds to an information regeneration apparatus of the present invention. A housing 101 of the HDD 100 shown in FIG. 1 contains: a rotation shaft 102; a magnetic disk 103 attached to the rotation shaft 102; a floating head slider 104 disposed close to and opposite to the surface of the magnetic disk 103; an arm shaft 105; a carriage arm 106, provided with the floating head slider 104 fixed to a tip end thereof, for horizontally moving on the magnetic disk 103 centering on the arm shaft 105; and an actuator 107 for driving the horizontal movement of the carriage arm 106.

The HDD 100 performs recording of information in the magnetic disk 103, and regeneration of the information recorded in the magnetic disk 103. During the recording and regeneration of the information, first the actuator 107 constituted of a magnetic circuit drives the carriage arm 106, and the floating head slider 104 is positioned in a desired track on the rotating magnetic disk 103. A magnetic head, not shown in FIG. 1, of the present embodiment is mounted on the tip end of the floating head slider 104. The magnetic head successively approaches respective one-bit regions arranged on respective tracks of the magnetic disk 103 by rotation of the magnetic disk 103. During the information recording, an electric recording signal is inputted to the magnetic head disposed in the vicinity of the magnetic disk 103 in this manner. The magnetic head applies a magnetic field to each of the one-bit regions in response to the inputted recording signal, and the information carried by the recording signal is recorded in the form of a magnetization direction of the one-bit region. Moreover, during the information regeneration, the magnetic head extracts the information recorded in the form of the magnetization direction of each one-bit region by generating an electric regeneration signal in accordance with the magnetic field generated from magnetization. An inner space of the housing 101 is closed by a cover (not shown).

The magnetic head of the present embodiment will next be described.

Figure 2:
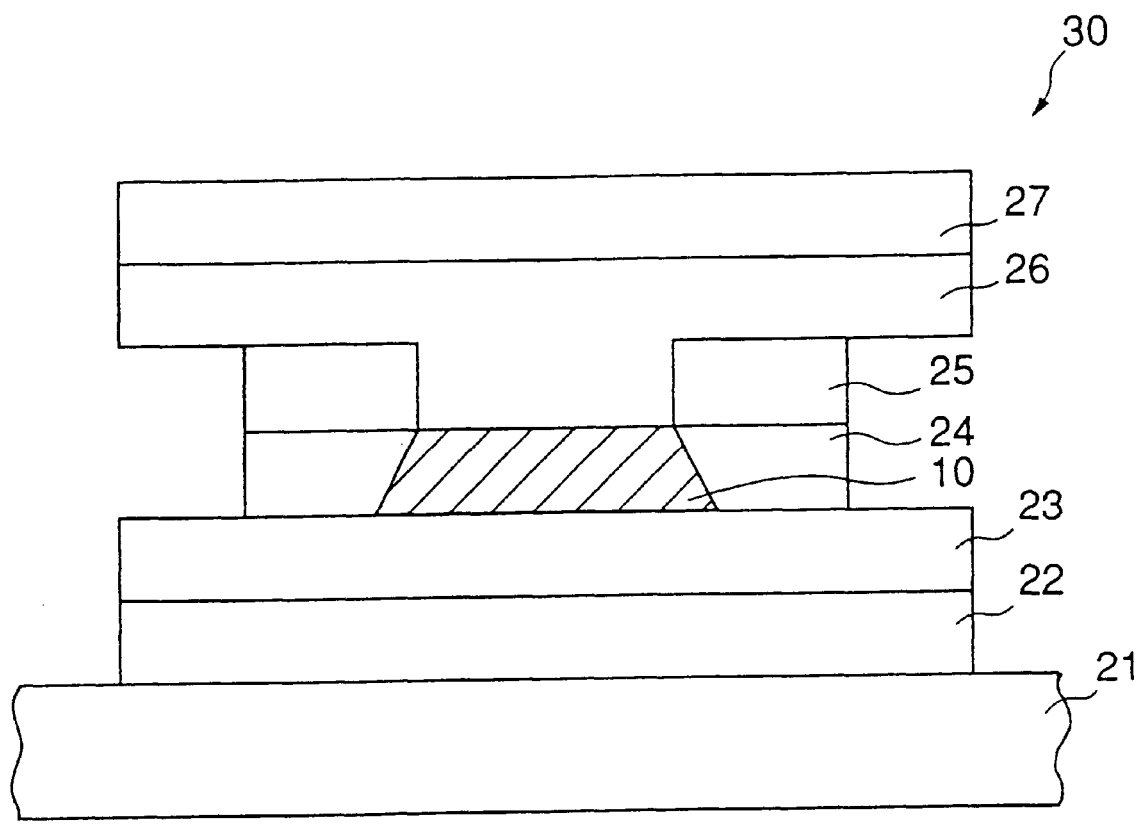
FIG. 2 is a main part sectional view of a magnetic head of the present embodiment.

FIG. 2 is a main part sectional view of the magnetic head of the present embodiment.

A magnetic head 30 of the present embodiment is a composite magnetic head provided with a recording section for recording the information in the magnetic disk 103 and a regeneration section for regenerating the information, and only the regeneration section is shown in FIG. 2. FIG. 2 is a sectional view of the regeneration section of the magnetic head cut along a surface parallel to a floating surface facing the magnetic disk 103 shown in FIG. 1.

The magnetic head 30 includes a nonmagnetic substrate 21, a lower shield layer 22 formed on the nonmagnetic substrate 21, a lower insulation layer 23 formed on the lower shield layer 22, a magnetoresistive film 10 formed on the lower insulation layer 23, a pair of left and right magnetic domain control layers 24 formed on the lower insulation layer 23 to hold the magnetoresistive film 10 from both sides, a pair of left and right electrodes 25 formed on the pair of left and right magnetic domain control layers 24, an upper insulation layer 26 formed on the pair of left and right electrodes 25 and magnetoresistive film 10, and an upper shield layer 27 formed on the upper insulation layer 26. The recording section (not shown) is formed on the upper shield layer 27. Additionally, the lower insulation layer 23 and upper insulation layer 26 correspond to a pair of insulation layers referred to in the present invention.

The substrate 21 is constituted by forming an Si film or an $SiO_2$ film on a substrate formed, for example, of alumina titanium carbide ($Al_2O_3$—TiC).

Each of the lower shield layer 22 and upper shield layer 27 is formed of a soft magnetic material, and magnetically shields the magnetoresistive film 10 in such a manner that an unnecessary external magnetic field fails to be applied to the magnetoresistive film 10. Each of these shield layers is formed, for example, of an FeN film with a thickness of 1.6 $\mu$m.

Each of the lower insulation layer 23 and upper insulation layer 26 is formed of an insulation material, and prevents a current leak from the magnetoresistive film 10, magnetic domain control layer 24, and the pair of electrodes 25. Each of these insulation layers is formed, for example, of an alumina ($Al_2O_3$) film with a thickness of 30 nm.

The magnetic domain control layer 24 applies a static magnetic field and a magnetic field by exchange interaction or the like to the magnetoresistive film 10. The magnetic domain control layer 24 is formed, for example, of Co—Pt alloy, Co—Cr—Pt alloy or another material indicating a hard magnetic property. Here, the magnetic domain control layer 24 is laminated to provide the same height as that of the magnetoresistive film 10.

The electrode 25 applies a sense current $I_s$ to the magnetoresistive film 10 via the magnetic domain control layer 24, and the regeneration signal is extracted from the pair of electrodes 25. The electrode 25 is formed of conductive materials such as a multilayered film of Ta/(Ti—W)/Ta consisting of two Ta layers and a Ti—W alloy held between these Ta layers.

For the magnetoresistive film 10, resistance changes in accordance with the magnetic field generated from magnetization of each one-bit region of the magnetic disk 103, and the film is a portion provided with a function of information regeneration of the magnetic head 30. Since the electrode 25 applies the sense current $I_s$ to the magnetoresistive film 10 as described above, the information carried by the magnetization direction of each one-bit region is extracted as the electric regeneration signal by the resistance change.

A characteristic of the present invention lies in a structure of the magnetoresistive film 10. An example of the magnetoresistive film 10, and a conventional magnetoresistive film 10' for comparison will next be illustrated to describe structures of the magnetoresistive films.

Figure 3:
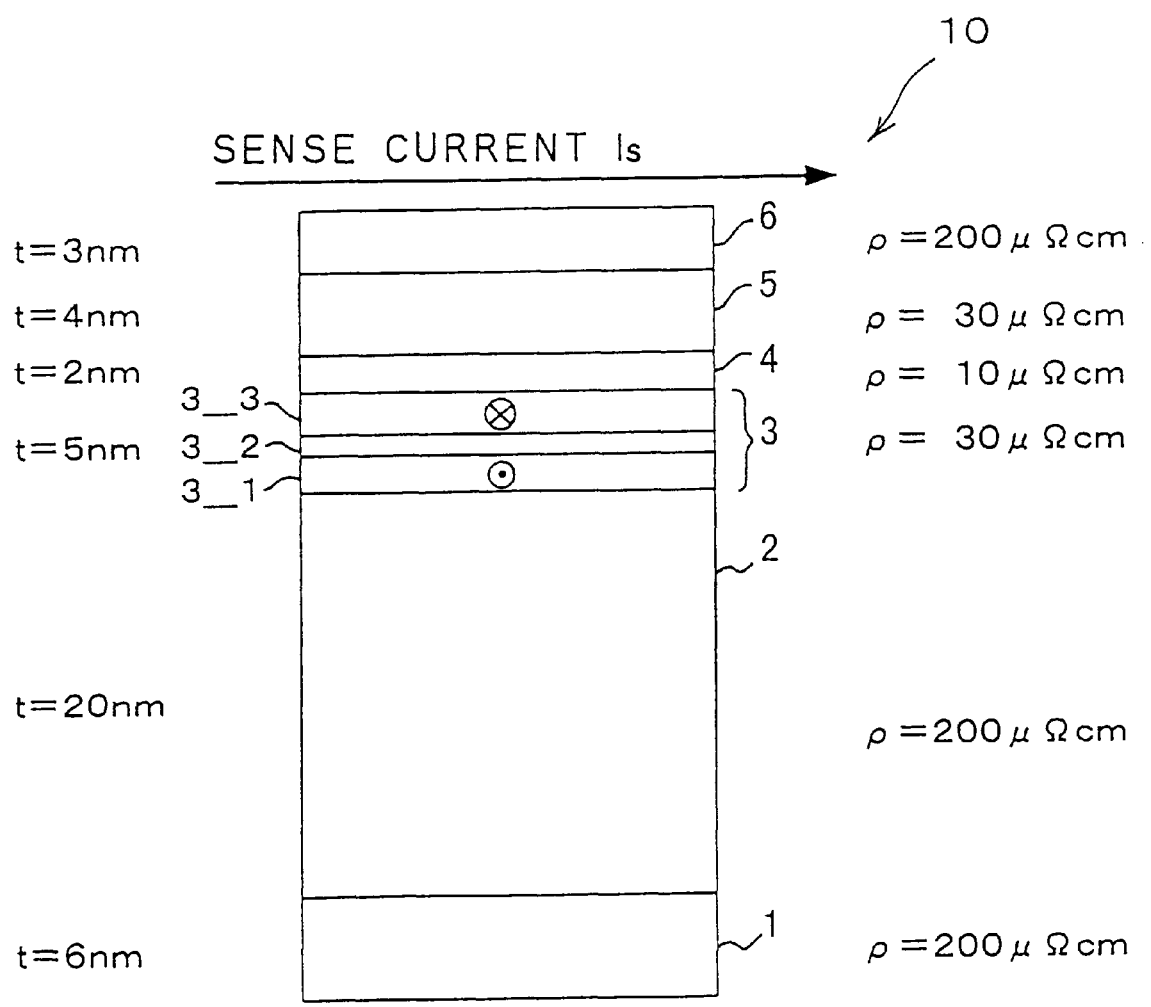
FIG. 3 is a sectional view of a magnetoresistive film of the present embodiment.

FIG. 3 is a sectional view of the magnetoresistive film in the present embodiment.

The magnetoresistive film 10 shown in FIG. 3 is one example of a spin valve magnetoresistive film, and is constituted of: an underlayer 1 formed on the lower insulation layer 23 shown in FIG. 2; an anti-ferromagnetic layer 2 formed on the underlayer 1; a pinned magnetic layer 3 formed on the antiferromagnetic layer 2; a nonmagnetic middle layer 4 formed on the pinned magnetic layer 3; a free magnetic layer 5 formed on the nonmagnetic middle layer 4; and a protective layer 6 formed on the free magnetic layer 5. Additionally, in FIG. 3, similarly as FIG. 2, a front surface represents a surface parallel to a floating surface, and as shown by an arrow directed in a left/right direction, a sense current $I_s$ is applied to the magnetoresistive film 10 from the pair of electrodes 25 in an element longitudinal direction.

Moreover, the magnetoresistive film of the present invention is not limited to the constitution described herein as long as a magnetoresistive effect is caused. For example, by changing a lamination order, on the underlayer 1, the free magnetic layer 5, nonmagnetic middle layer 4, pinned magnetic layer 3, antiferromagnetic layer 2, and protective layer 6 may be formed in this order.

The respective layers constituting the magnetoresistive film 10 will be described hereinafter.

The underlayer 1 is a layer as a substrate of the respective layers constituting the magnetoresistive film 10. The underlayer 1 is constituted, for example, of a Ta film formed on the lower insulation layer 23 with a thickness of 6 nm and resistivity of 200 $\mu\Omega$cm. Definition of the resistivity will be described later.

The antiferromagnetic layer 2 is formed of an antiferromagnetic material, and applies, to the pinned magnetic layer 3, an interlayer coupling field attributed to interlayer coupling. The antiferromagnetic layer 2 is formed, for example, of a Pd—Pt—Mn alloy film with a thickness of 20 nm, and resistivity of 200 $\mu\Omega$cm.

The pinned magnetic layer 3 includes a soft magnetic material, and is provided with magnetization whose direction is fixed by the interlayer coupling field applied from the antiferromagnetic layer 2. The pinned magnetic layer 3 is a so-called laminated ferri-film comprising a first soft magnetic layer 3_1 and second soft magnetic layer 3_3 indicating soft magnetic properties, and an antiparallel coupling middle layer 3_2, held between these soft magnetic layers in a thickness direction, for coupling the magnetizations of the soft magnetic layers to each other in opposite directions.

The first soft magnetic layer 3_1 is a layer formed adjacent to the antiferromagnetic layer 2 in the thickness direction, and the second soft magnetic layer 3_3 is a layer formed adjacent to the nonmagnetic middle layer 4 in the thickness direction and indicating a soft magnetic property. The first soft magnetic layer 3_1 is formed, for example, of a Co—Fe—B alloy film with a thickness of 2 nm, and the second soft magnetic layer 3_3 is formed, for example, of the Co—Fe—B alloy film with a thickness of 2.5 nm. Moreover, the antiparallel coupling middle layer 3_2 is formed, for example, of an Ru film with a thickness of 0.5 nm. The resistivity of the Ru film is substantially the same as the resistivity of the Co—Fe—B alloy film, and here the pinned magnetic layer 3 has a resistivity of 30 $\mu\Omega$cm on average in the entire layer.

For the first soft magnetic layer 3_1 constituting the pinned magnetic layer 3, the magnetization is fixed in a direction perpendicular to a floating surface by the interlayer coupling field applied from the antiferromagnetic layer 2. On the other hand, for the second soft magnetic layer 3_3 constituting the pinned magnetic layer 3, the magnetization is fixed by the antiparallel coupling middle layer 3_2 in a direction similarly perpendicular to the floating surface but opposite to the direction of the magnetization of the first soft magnetic layer 3_1.

In general, for the pinned magnetic layer 3 constituted of the laminated ferri-film, since the two soft magnetic layers are provided with the magnetizations of the opposite directions, the magnitude of the magnetization of the entire pinned magnetic layer 3 is small. When the magnitude of the magnetization is small, the magnetization is not easily influenced by the magnetic field from the outside, and is stabilized and pinned. Moreover, when the magnetization magnitude is small in this manner, a diamagnetic field of the magnetization is minimized, and disorder of a signal magnetic field $H_{sig}$ from the magnetic disk 103 is also reduced.

The nonmagnetic middle layer 4 is a layer formed of a nonmagnetic conductive material, and serves as a spacer for separating the pinned magnetic layer 3 from the free magnetic layer 5. The nonmagnetic middle layer 4 is formed, for example, of a Cu film with a thickness of 2 nm, and resistivity of 10 $\mu\Omega$cm.

The free magnetic layer 5 is not pinned and is formed of a soft magnetic material provided with magnetization freely rotating in accordance with an external magnetic field. The free magnetic layer 5 is constituted by a 2-layer film, for example, of a 1 nm thick layer of a Co—Fe—B alloy and a 3 nm thick layer of an Ni—Fe alloy. The Co—Fe—B alloy as one material constituting the 2-layer film fails to easily diffuse mutually with Cu as compared with NiFe, and is therefore preferable as the material of the layer directly formed on the nonmagnetic middle layer 4 of Cu. Here, the resistivity of the Co—Fe—B alloy is substantially the same as the resistivity of the Ni—Fe alloy, and here the free magnetic layer 5 has a resistivity of 30 $\mu\Omega$cm on average in the entire layer.

The magnetization of the free magnetic layer 5 rotates in a plane of the free magnetic layer 5 in accordance with the magnetic field from the magnetization of each one-bit region of the magnetic disk 103. Sheet resistance of the magnetoresistive film 10 largely changes by a so-called giant magnetoresistive effect in accordance with an angle formed by the magnetization of the free magnetic layer 5 and the fixed magnetization of the pinned magnetic layer 3. For example, the resistance indicates a minimum value when these magnetizations are directed in the same direction, and indicates a maximum value when these magnetizations are directed in opposite directions. A difference between the maximum value and the minimum value constitutes the resistance change $\Delta\rho/t$, and the regeneration signal is outputted through the sense current $I_s$ by the resistance change $\Delta\rho/t$.

Additionally, the free magnetic layer 5 is provided with a single magnetic domain by the magnetic field applied by the magnetic domain control layer 24. Therefore, in the magnetic head 30 including the free magnetic layer 5, Barkhausen noise is inhibited from being generated in the regeneration signal accompanying a moving magnetic wall.

The protective layer 6 is high in anticorrosion, physically and chemically protects the copper oxide layer 7, and is formed, for example, of a Ta film with a thickness of 3 nm, and resistivity of 200 $\mu\Omega$cm.

In order to form the magnetoresistive film 10 constituted of the aforementioned respective layers, for example, first, by DC magnetron sputtering in an Ar atmosphere, on a multilayered film of the nonmagnetic substrate 21/lower shield layer 22/lower insulation layer 23, adjacent to the underlayer 1, the respective layers constituting the magnetoresistive film 10 are continuously laminated using the illustrate materials of the respective layers in the illustrated thickness. Subsequently, by applying an external magnetic field of 800 kA/m or more to the entire laminated film to such an extent that the magnetization of the entire pinned magnetic layer 3 including the antiparallel coupling middle layer 3_2 is saturated, a heat treatment is performed, for example, at a temperature of 250° C. or more at which the Pd—Pt—Mn alloy constituting the antiferromagnetic layer 2 is regulated.

Figure 4:
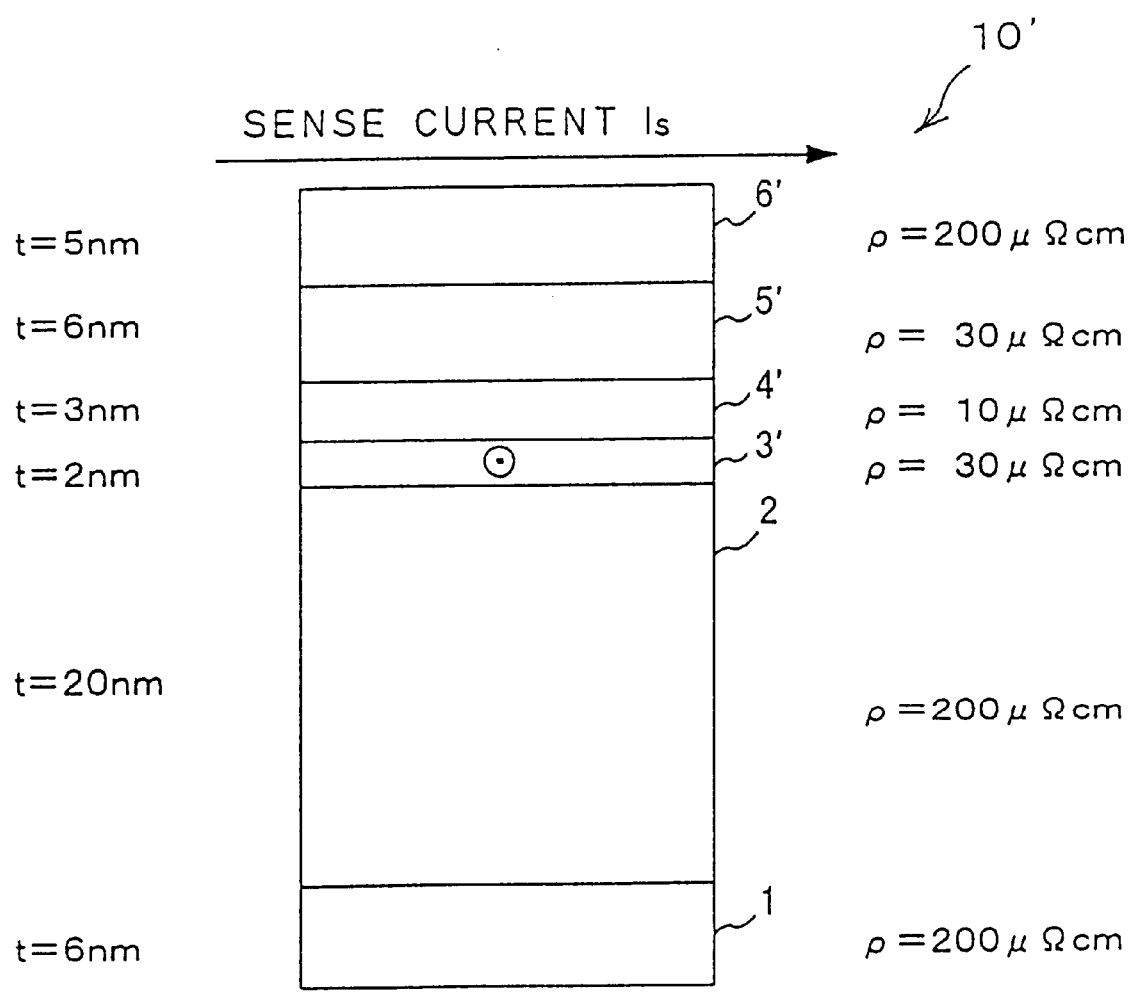
FIG. 4 is a sectional view of a conventional magnetoresistive film.

The constitution of the conventional magnetoresistive film 10' is shown in FIG. 4 as an object of comparison with the magnetoresistive film 10.

FIG. 4 is a sectional view of the conventional magnetoresistive film.

The magnetoresistive film 10' shown in FIG. 4 is constituted by replacing the pinned magnetic layer 3 of the magnetoresistive film 10 of the present embodiment shown in FIG. 3 with a pinned magnetic layer 3' of a single-layer film of a Co—Fe—B alloy having a thickness of 2 nm, and replacing the nonmagnetic middle layer 4, free magnetic layer 5, and protective layer 6 with a 3 nm thick nonmagnetic middle layer 4', 6 nm thick free magnetic layer 5', and 5 nm thick protective layer 6' while unchanging the constituting materials of the respective layers. Here, the resistivity of each layer constituting the conventional magnetoresistive film 10' is equal to the resistivity of each layer constituting the magnetoresistive film 10 and having the same name. The resistivity of each layer constituting the magnetoresistive film, referred to herein, means a resistivity $\rho$ ($\rho=\rho\square[\mu\Omega$ cm]) defined based on a sheet resistivity $\rho\square[\Omega/\square]$ which is obtained by measurement of a 10 nm thick single-layer film only of each layer constituting material in a four-probe method.

Additionally, the conventional magnetoresistive film 10' is different from the magnetoresistive film 10 of the present embodiment in a position of a current center.

The current center is a position of a thickness direction for dividing a current into two to obtain respective equal current amounts when the current is passed parallel to the magnetoresistive film. Specifically, the current center is a position in which when a ratio t/ρ of a layer thickness t of each layer constituting the magnetoresistive film to the resistivity ρ is normalized by a total Σ(t/ρ), an integrated value obtained by integrating the normalized ratio t/ρ in the film thickness direction is 0.5.

described, and the ratio t/ρ, and normalized ratio t/ρ are obtained from the numeric values of the layer thickness t and resistivity ρ as described above.

When the integrated value of the normalized ratio t/ρ is obtained in order from the protective layer side based on the obtained normalized ratio t/ρ, the integrated values in the conventional magnetoresistive film 10' shown in Table 1 are 0.0346 in the entire protective layer, 0.312 up to the free magnetic layer, and 0.728 up to the nonmagnetic middle

TABLE 1

| | Layer thickness t [nm] | Resistivity ρ [μΩcm] | Ratio t/ρ [nm/μΩcm] | Normalized ratio t/ρ | Integrated value (from protective layer side) |
|---|---|---|---|---|---|
| Protective layer | 5 | 200 | 0.025 | 0.0346 | 0.0346 |
| Free magnetic layer | 6 | 30 | 0.2 | 0.277 | 0.312 |
| Nonmagnetic middle layer a | 1.35 | 10 | 0.135 | 0.187 | 0.50 |
| Nonmagnetic middle layer b | 1.65 | 10 | 0.165 | 0.229 | 0.728 |
| Pinned magnetic layer | 2 | 30 | 0.067 | 0.0924 | 0.820 |
| Antiferromagnetic layer | 20 | 200 | 0.1 | 0.139 | 0.958 |
| Underlayer | 6 | 200 | 0.03 | 0.0416 | 1.0 |

TABLE 2

| | Layer thickness t [nm] | Resistivity ρ [μΩcm] | Ratio t/ρ [nm/μΩcm] | Normalized ratio t/ρ | Integrated value (from protective layer side) |
|---|---|---|---|---|---|
| Protective layer | 3 | 200 | 0.015 | 0.0213 | 0.0213 |
| Free magnetic layer | 4 | 30 | 0.067 | 0.189 | 0.210 |
| Nonmagnetic middle layer | 2 | 10 | 2.0 | 0.284 | 0.494 |
| Pinned magnetic layer a | 0.025 | 30 | 0.004375 | 0.00620 | 0.50 |
| Pinned magnetic layer b | 4.725 | 30 | 0.078958 | 0.11193 | 0.816 |
| Antiferromagnetic layer | 20 | 200 | 0.1 | 0.142 | 0.957 |
| Underlayer | 6 | 200 | 0.03 | 0.0425 | 1.0 |

Table 1 shows calculation results of the current center in the conventional magnetoresistive film 10' shown in FIG. 4, and Table 2 shows calculation results of the current center in the magnetoresistive film 10 of the present embodiment shown in FIG. 3. In leftmost columns of these tables, shown are names of the respective layers constituting the magnetoresistive film such as "protective layer", "free magnetic layer", "nonmagnetic middle layer", "pinned magnetic layer", "antiferromagnetic layer", and "underlayer". Additionally, as described soon later, in the magnetoresistive film 10' shown in Table 1, it is assumed that the current center exists in the nonmagnetic middle layer, and the nonmagnetic middle layer is divided into "nonmagnetic middle layer a" and "nonmagnetic middle layer b" via the current center. Moreover, in the magnetoresistive film 10 shown in Table 2, it is assumed that the current center exists in the pinned magnetic layer, and the pinned magnetic layer is divided into "pinned magnetic layer a" and "pinned magnetic layer b" via the current center.

In topmost rows of these tables, respective items such as "layer thickness t", "resistivity ρ", "ratio t/ρ", "normalized ratio t/ρ", and "integrated value" from a protective layer side of the normalized ratio t/ρ are shown, and numeric values of these respective items are shown in respective rows showing the respective layers of these tables. Among these numeric values, the numeric values of the layer thickness t and resistivity ρ of the protective layer, free magnetic layer, nonmagnetic middle layer, pinned magnetic layer, antiferromagnetic layer, and underlayer have been already layer. Therefore, it is understood that the current center with the integrated value of 0.5 is positioned in the nonmagnetic middle layer in the conventional magnetoresistive film 10'. In this case, for the nonmagnetic middle layer, the layer thickness t of the nonmagnetic middle layer a on the free magnetic layer side from the current center is 1.35 nm, and the-layer thickness t of the nonmagnetic middle layer b on the pinned magnetic layer side is 1.65 nm.

Similarly, the integrated values in the magnetoresistive film 10 of the present embodiment shown in Table 2 are 0.0213 in the protective layer, 0.210 up to the free magnetic layer, 0.494 up to the nonmagnetic middle layer, and 0.816 up to the pinned magnetic layer. Therefore, it is understood that the current center with the integrated value of 0.5 is positioned in the pinned magnetic layer in the magnetoresistive film 10 of the present embodiment. In this case, for the pinned magnetic layer, the layer thickness t of the pinned magnetic layer a on the nonmagnetic middle layer side from the current center is 0.025 nm, and the layer thickness t of the pinned magnetic layer b on the antiferromagnetic layer side is 4.725 nm.

In this manner, for the magnetoresistive film 10 of the present embodiment, as compared with the conventional magnetoresistive film 10', the current center exists in the pinned magnetic layer or in the vicinity of the pinned magnetic layer. For the conventional magnetoresistive film 10', as illustrated, the current center is positioned on the side including the free magnetic layer from the center position of the layer thickness of the nonmagnetic middle layer, and the magnetoresistive film 10 of the present embodiment is characterized in that the current center is positioned on the side including the pinned magnetic layer when the magnetoresistive film 10 is divided into two at the center position of the layer thickness of the nonmagnetic middle layer in the thickness direction.

When the current center is in the pinned magnetic layer or in the vicinity of the pinned magnetic layer in this manner, the magnetoresistive film is provided with resistance to destruction such as electrostatic destruction as described later.

Figure 5:
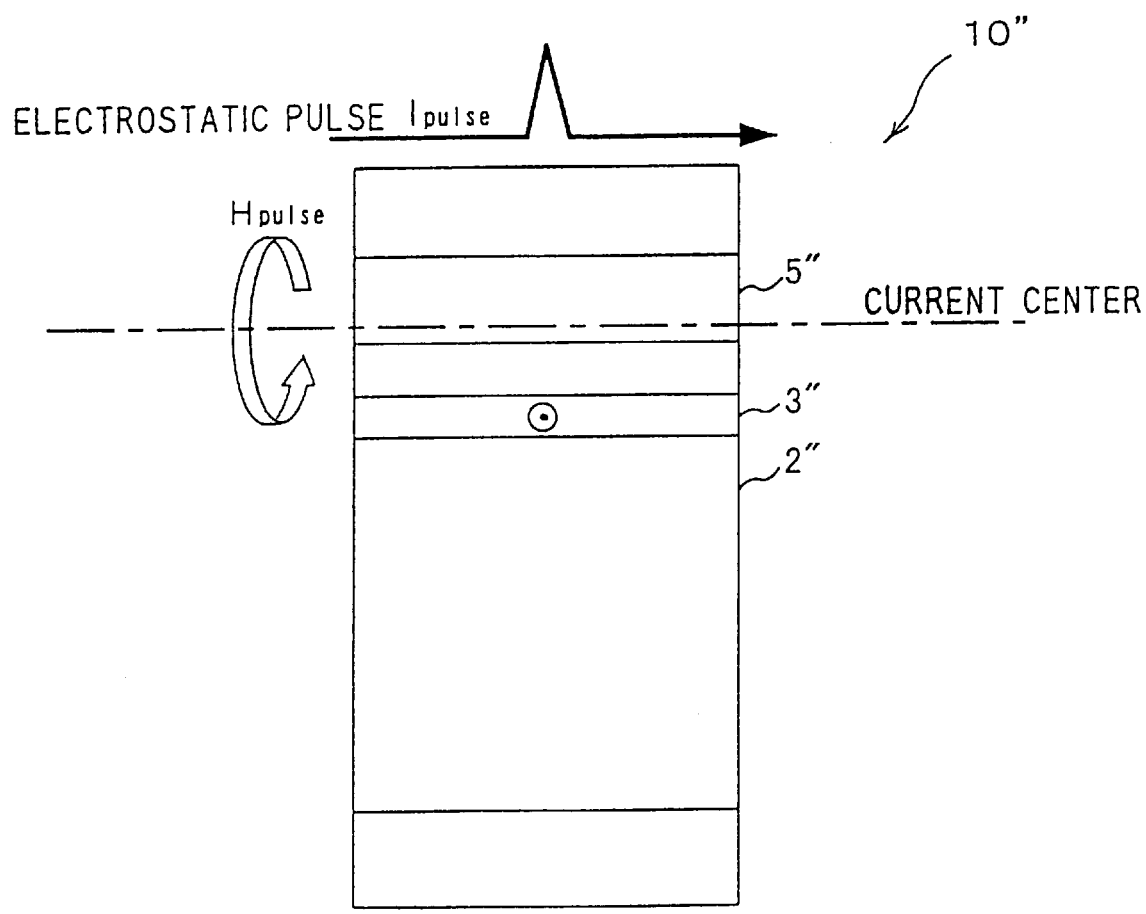
FIG. 5 is a schematic view of an electrostatic destruction process in the conventional magnetoresistive film.

FIG. 5 is a schematic view of an electrostatic destruction process in the conventional magnetoresistive film.

FIG. 5 shows a magnetoresistive film 10" in which by changing the thickness of each layer constituting the conventional magnetoresistive film 10' shown in FIG. 4, similarly as many conventional magnetoresistive films, the current center is positioned in the free magnetic layer. Moreover, FIG. 5 shows the current center flowing through a free magnetic layer 5" constituting the magnetoresistive film 10' by a dashed line.

In general, in the magnetoresistive film, by discharge of accumulated charges from the outside or inside, a phenomenon of electric static discharge (ESD) is seen in which an electrostatic pulse $I_{pulse}$ except the sense current $I_s$ flows. As shown in FIG. 5, when the electrostatic pulse $I_{pulse}$ flows from the left to the right of the drawing in the magnetoresistive film 10", the temperature of the magnetoresistive film 10" momentarily rises, for example, to about 350° C. Moreover, a pulse magnetic field $H_{pulse}$ is generated simultaneously with temperature rise by the electrostatic pulse $I_{pulse}$. Depending upon a flow direction of the electrostatic pulse $I_{pulse}$, in a pinned magnetic layer 3" constituting the magnetoresistive film 10", the pulse magnetic field $H_{pulse}$ is directed in a direction (back direction from a sheet surface in this example) opposite to a magnetization direction (surface direction from the back of the sheet surface) of the pinned magnetic layer 3". A temperature (blocking temperature) at which an antiferromagnetic layer 2" for use in the magnetoresistive film 10" loses its interlayer coupling force with the pinned magnetic layer 3" is about 300° C. at most. Therefore, when the temperature of the magnetoresistive film 10" rises to about 350° C., the magnetization direction of the pinned magnetic layer 3" is reversed by the pulse magnetic field $H_{pulse}$. Furthermore, by the reversed magnetization, an output from a regeneration section of the magnetic head 10 including the magnetoresistive film 10" is also reversed. Moreover, depending upon situations, the entire magnetization of the pinned magnetic layer 3" substantially disappears by the pulse magnetic field $H_{pulse}$, and an output from a regeneration head sometimes becomes very weak. In this manner, the generation of the electrostatic pulse $I_{pulse}$ causes destruction of the magnetoresistive film with a magnetic property trouble, this destruction causes a trouble in the output from the regeneration head and it becomes difficult to regenerate information.

The destruction of the magnetoresistive film is avoided to some degree by constructing an operation environment where no ESD is generated, using antiferromagnetic materials high in blocking temperature such as PtMn, NiMn, PdPtMn as the material constituting the antiferromagnetic layer, forming the pinned magnetic layer into the aforementioned laminated ferri-film, and taking other countermeasures. However, only with these countermeasures, the destruction of the magnetoresistive film occurs with a frequency which cannot still be ignored.

A factor of the reversed magnetization generated by ESD or another trouble lies in an influence of the generation of the pulse magnetic field $H_{pulse}$ on the magnetization of the pinned magnetic layer as described above. As shown in FIG. 5 and Table 1, in a film structure in which the current center is positioned in the vicinity of the free magnetic layer, the pulse magnetic field $H_{pulse}$ is strong in the pinned magnetic layer. On the other hand, like the magnetoresistive film 10 of the present embodiment, in the film structure in which the thickness t and resistivity ρ of the respective layers constituting the magnetoresistive film are adjusted to position the current center on a side including the pinned magnetic layer from the film thickness center of the nonmagnetic middle layer, preferably in the pinned magnetic layer, the strength of the pulse magnetic field $H_{pulse}$ in the pinned magnetic layer is reduced. In this manner, for magnetoresistive film, in a case where the film thickness and material of each layer constituting the magnetoresistive film are adjusted in such a manner that the current center is positioned on the pinned magnetic layer side from the film thickness center of the nonmagnetic middle layer in the magnetoresistive film, the trouble fails to easily occur in the magnetic property, and the resistance to the destruction by ESD is enhanced.

Additionally, in the film structure in which the current center is positioned on the side including the pinned magnetic layer from the film thickness center of the nonmagnetic middle layer in this manner, the strength of the pulse magnetic field $H_{pulse}$ in the free magnetic layer increases. However, a direction of a magnetization ease axis of the free magnetic layer is hardly influenced. This is because the direction of the magnetization ease axis is determined by the magnetic domain control layer 24, and Curie temperature for eliminating ferromagnetism of the magnetic domain control layer 24 is different from the blocking temperature and is generally much higher than the temperature of 350° C.

As described above, according to the present invention, there are provided a magnetoresistive film high in resistance to destruction, a magnetoresistive head provided with the magnetoresistive film, and an information regeneration apparatus provided with the magnetoresistive head.

What is claimed is:

1. A magnetoresistive film comprising a multilayered film including: a bias layer for generating a bias magnetic field; a pinned magnetic layer having magnetization whose direction is fixed by the bias magnetic field generated from the bias layer; a free magnetic layer having magnetization whose direction changes in accordance with an external magnetic field; and a nonmagnetic middle layer held between the pinned magnetic layer and the free magnetic layer in a thickness direction and indicating a magnitude of resistance in accordance with an angle between the magnetization direction of the pinned magnetic layer and the magnetization direction of the free magnetic layer, and being held between a pair of insulation layers in the thickness direction, wherein when a current is passed parallel to said magnetoresistive film, a current center as a position of the thickness direction for dividing the current into two so as to obtain respective equal current amounts is positioned on a side including said pinned magnetic layer during dividing of the magnetoresistive film into two in a center position of a layer thickness of said nonmagnetic middle layer in the thickness direction.

2. The magnetoresistive film according to claim 1 wherein said current center is positioned in said pinned magnetic layer.

3. A magnetoresistive head, provided with a magnetoresistive film comprising a multilayered film including: a bias layer for generating a bias magnetic field; a pinned magnetic layer having magnetization whose direction is fixed by the bias magnetic field generated from the bias layer; a free magnetic layer having magnetization whose direction changes in accordance with an external magnetic field; and a nonmagnetic middle layer held between the pinned magnetic layer and the free magnetic layer in a thickness direction and indicating a magnitude of resistance in accordance with an angle between the magnetization direction of the pinned magnetic layer and the magnetization direction of the free magnetic layer, for detecting the magnitude of the resistance of the magnetoresistive film to detect a strength of said external magnetic field, said magnetoresistive head comprising a pair of insulation layers for holding said magnetoresistive film in the thickness direction, wherein for the magnetoresistive film held by said pair of insulation layers, when a current is passed parallel to the magnetoresistive film, a current center as a position of the thickness direction for dividing the current into two so as to obtain respective equal current amounts is positioned on a side including said pinned magnetic layer during dividing of the magnetoresistive film into two in a center position of a layer thickness of said nonmagnetic middle layer in the thickness direction.

4. An information regeneration apparatus comprising a magnetic head, disposed in the vicinity of or in contact with a magnetic recording medium on which information is recorded in accordance with a magnetization direction, for detecting the magnetization direction of respective points of the magnetic recording medium, to regenerate the information in accordance with the magnetization direction of the respective points of said magnetic recording medium detected by the magnetic head, wherein said magnetic head comprises a magnetoresistive film comprising a multilayered film including: a bias layer for generating a bias magnetic field; a pinned magnetic layer having magnetization whose direction is fixed by the bias magnetic field generated from the bias layer; a free magnetic layer having magnetization whose direction changes in accordance with an external magnetic field; and a nonmagnetic middle layer held between the pinned magnetic layer and the free magnetic layer in a thickness direction and indicating a magnitude of resistance in accordance with an angle between the magnetization direction of the pinned magnetic layer and the magnetization direction of the free magnetic layer, and detects the magnitude of the resistance of the magnetoresistive film to detect a strength of said external magnetic field, said magnetic head comprises a pair of insulation layers for holding said magnetoresistive film in the thickness direction, and for the magnetoresistive film held by said pair of insulation layers, when a current is passed parallel to the magnetoresistive film, a current center as a position of the thickness direction for dividing the current into two so as to obtain respective equal current amounts is positioned on a side including said pinned magnetic layer during dividing of the magnetoresistive film into two in a center position of a layer thickness of said nonmagnetic middle layer in the thickness direction.

* * * * *